Sept. 13, 1966  J. GLANZER  3,272,540
FASTENING ELEMENT FOR MEMBERS FORMING
STRUCTURES OF SCAFFOLDS AND THE LIKE
Filed Sept. 24, 1963

INVENTOR:
Jacobo Glanzer,
BY
Ernest A. Marmorek,
His Attorney

United States Patent Office 3,272,540
Patented Sept. 13, 1966

3,272,540
FASTENING ELEMENT FOR MEMBERS FORMING STRUCTURES OF SCAFFOLDS AND THE LIKE
Jacobo Glanzer, Av. Roque Saenz Pena 570, Buenos Aires, Argentina
Filed Sept. 24, 1963, Ser. No. 311,033
2 Claims. (Cl. 287—54)

The present invention refers to a new fastening element for structures and scaffolds formed by tubular members, said element providing a special and new constructive arrangement, the main purpose of which is to provide in one unit, securing means for three structure members, one of vertical orientation and two of horizontal orientation, the latter angularly displaced towards each other.

At present, the elements used to form scaffolds are double clamps which, based on different constructive arrangements, often do not allow to engage more than two pipes or similar elements at one point, and therefore it is necessary, in order to group three pipes, to use at least two of said double clamps.

Thus, such conventional systems are complicated because of the number of fastening elements used, and costly as to the labour required.

The new fastening element is designed to simplify and hasten to a considerable degree the coupling operations of the different parts of a structure or scaffold, such element being a unit of high resistance, constructively simple, for easy and quick handling as regards to its application and adjustment.

Therefore, one of the essential objects of the invention is to provide a simple and efficient coupling element allowing to group, with different orientations, three members forming a structure i.e. a triple clamp.

Another object of the invention is to provide said element with means for adjusting it quickly and easily.

A further object of the invention is to furnish the coupling elements with cooperating means for the fastening and adjustment, such as cables, tighteners or the like.

The other objects and advantages of the present invention will be seen in the description of same, which for better clearness and understanding has been illustrated with several schematic figures in which is shown, by way of example only, the new fastening element:

In the figures, the same signs indicate equal or corresponding parts.

Figure 1:
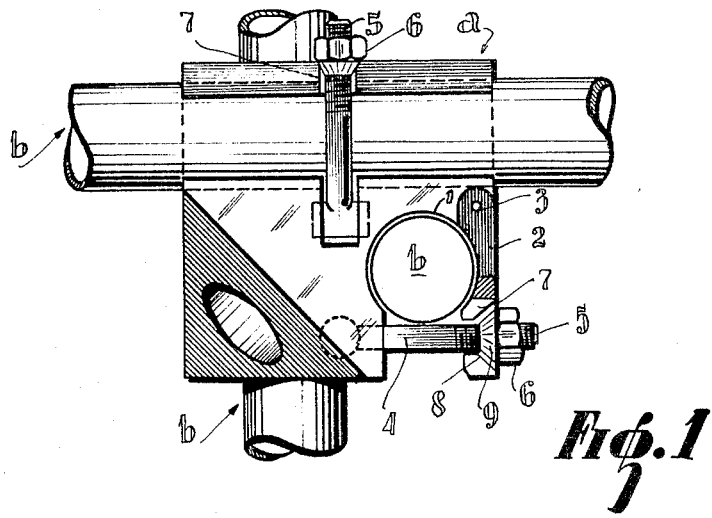
FIG. 1 is an elevational, partly sectional, view of an element according to the present invention, showing the arrangement of the pipes which are grouped and fastened by means of said element.

As may be seen in the drawings, the new fastening element object of this invention comprises a body *a* preferably in the form of a cube, which comprises three grooves 1 made so that they are inter-crossed but substantially independent from one another.

Each of said grooves 1 is located next to a respective salient angle of the cube; the outer wall of the groove is formed by an angularly slidable wing 2, joined to the body *a* by a suitable type of hinge 3.

Figures 2, 3:
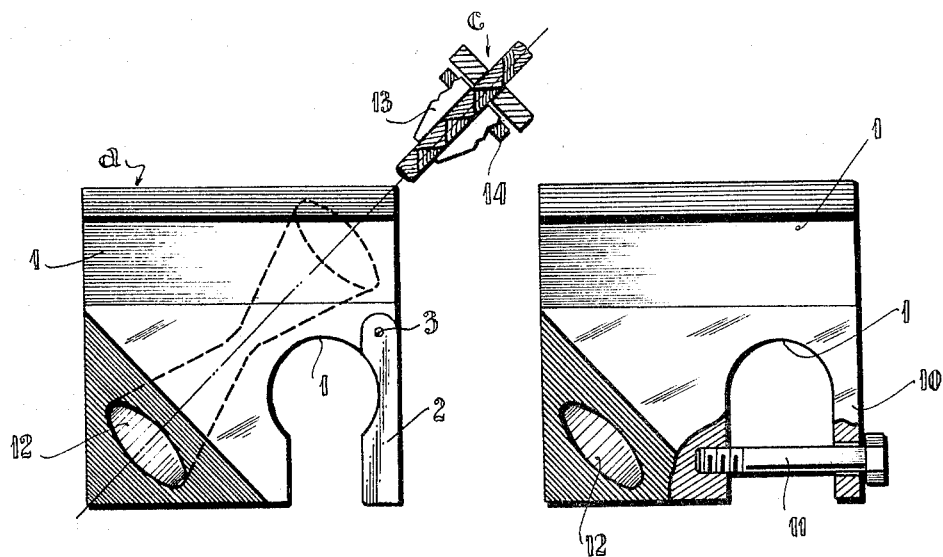
FIG. 2 is an elevational view of said element, in which may be seen an internal passage therein, where cables or tighteners are received, and lastly.
FIG. 3 is an elevation view, partly in section, of a modification.

In FIGURES 1 and 2 it is particularly easy to observe the transversal section formed by the grooves 1, it being evident that the bottom thereof is slightly widened in respect of its mouths, and it follows a semicircular shape allowing easy and perfect setting-up of the corresponding pipe or tube *b*.

For the purpose of fastening or adjusting the pipes *b* within the respective grooves 1, the slidable wings 2 are provided with means pressing them against the pipes or tubes *b*. Said means may be constituted by bolts 4 pin-jointed on the body *a*, the free ends 5 of which are threaded to allow adaptation of adjusting nuts 6.

As may be seen in FIGURE 1, the free ends of the wings 2 have setting notches 7 for the terminals of bolts 4, said notches 71 having frusto-conical recesses 8 to which are adapted the frusto-conical bases 9 of the adjusting nuts 6 already mentioned.

It has been foreseen and it is part of this invention, that wings 2 instead of articulated elements, might be formed by integral portions 10 having some elasticity. To such portions are fixed adjusting screws 11, all according to the illustration in FIG. 3.

Also envisaged as part of the invention, to provide the mass forming the cube not affected by the grooves 1, with a passage diagonally oriented (FIG. 2) allowing the insertion of cables, tighteners or the like, as shown with reference number 12 in said FIGURE 2.

This passage provides two frusto-conical sections, which allow a certain sidewards displacement of the cable, tightener or the like, indicated by *c*, and on the other hand serve as setting points for a compressible stopper 13 through which said cable goes. As seen in FIGURE 2, said stopper resembles a mandrel, having an adjusting screw 14, and cooperating with same, its conic end which fits within the passage 12 of coinciding shape, this assuring a perfect holding of the abovesaid tightener or cable.

It is easy to understand, looking preferably at FIG. 1, how quick, easy and perfect results are achieved with a fastening made with the element as designed for grouping in one unit, three different tubular members being part of a certain structure.

I wish it to be understood that I do not desire to be limited to the exact details of construction shown and described, for obvious modifications will occur to a person skilled in the art.

Having thus described this invention, what I claim as new and desire to be secured by Letters Patent, is as follows:

1. A connecting piece, for use in interconnecting three elongated cylindrical elements at right angles to each other free from intersection, comprising a substantially cube shaped body containing three channels at right angles to each other and free from intersection with each other, each channel being located in a separate face of the cube and having a U-shaped cross section including a semi-circular arcuate bottom portion and two straight leg portions connected thereto, the section of said channel between said straight leg portions being unobstructed throughout the length of the channel by any part of said body, the radius of said semi-circular portion corresponding to that of a cylindrical element, each channel being adapted to engage removably an element, and being open throughout its length between said straight leg portions, one of said straight leg portions being relatively narrow and flexible, and an adjustable fastening means connected to and extending between said flexible leg and a part of the body opposite thereto which defines the other leg, said fastening means projecting across said unobstructed channel section and being adjustable so as to move said resilient leg toward the other leg thereby reducing the extent of the channel opening to clamp a cylindrical element in said channel, said cube shaped body also having a passage extending diagonally therethrough from one corner portion to another with the passage being free from intersection with any of the channels, and adapted to receive a cable therethrough.

2. A connecting piece, as claimed in claim 1, said passage being composed of two opposite frusto-conical portions flaring from the cube center outwardly.

References Cited by the Examiner
UNITED STATES PATENTS 2,171,076  8/1939  Borsetti.
2,569,464  10/1951  Edwards et al.
2,879,087  3/1959  Haglund.

FOREIGN PATENTS 1,012,892  4/1952  France.
798,278  7/1958  Great Britain.
351,783  8/1937  Italy.
237,550  8/1945  Switzerland.

CARL W. TOMLIN, *Primary Examiner.*